United States Patent
Sisk

(10) Patent No.: US 9,057,445 B2
(45) Date of Patent: Jun. 16, 2015

(54) BUTTERFLY VALVE DISC TO ATTAIN ACCELERATED FLOW

(71) Applicant: David E. Sisk, Bonne Terre, MO (US)

(72) Inventor: David E. Sisk, Bonne Terre, MO (US)

(73) Assignee: Bulk Tank, Inc., Park Hills, MD (US)

( * ) Notice: Subject to any disclaimer, the term of this patent is extended or adjusted under 35 U.S.C. 154(b) by 161 days.

(21) Appl. No.: 13/815,281

(22) Filed: Feb. 19, 2013

(65) Prior Publication Data

US 2013/0228713 A1 Sep. 5, 2013

Related U.S. Application Data

(63) Continuation-in-part of application No. 29/373,130, filed on Mar. 4, 2011, which is a continuation-in-part of application No. 29/374,020, filed on Jun. 23, 2011, which is a continuation-in-part of application No. 13/506,246, filed on Apr. 6, 2012.

(60) Provisional application No. 61/634,580, filed on Mar. 2, 2012, provisional application No. 61/517,200, filed on Apr. 18, 2011.

(51) Int. Cl.
*F16K 1/22* (2006.01)

(52) U.S. Cl.
CPC . *F16K 1/22* (2013.01); *F16K 1/222* (2013.01); *F16K 1/224* (2013.01)

(58) Field of Classification Search
CPC ............. F16K 1/22; F16K 1/222; F16K 3/08; F16K 27/0218
USPC ................................... 251/304–308; 123/337
See application file for complete search history.

(56) References Cited

U.S. PATENT DOCUMENTS

| | | | |
|---|---|---|---|
| 965,322 A | 7/1910 | Peterson | |
| 1,131,371 A | 3/1915 | Hatfield | |
| 1,302,891 A | 5/1919 | Balthasar | |
| 2,278,421 A | 4/1942 | Brown | |
| 2,361,006 A | 10/1944 | Brown | |
| 2,740,423 A | 4/1956 | Stillwagon | |
| 2,816,729 A | 12/1957 | Jensen | |
| 2,882,010 A | 4/1959 | Bryant | |
| 2,912,218 A | 11/1959 | Stillwagon | |
| 2,936,778 A | 5/1960 | Stillwagon | |
| 2,994,342 A | 8/1961 | Stillwagon | |
| 3,024,802 A | 3/1962 | Stillwagon | |
| 3,043,557 A | 7/1962 | Stillwagon | |
| 3,051,435 A | 8/1962 | Ramsey | |
| 3,072,139 A | 1/1963 | Mosites | |
| 3,100,500 A | 8/1963 | Stillwagon | |
| 3,118,465 A * | 1/1964 | Scaramucci | 137/454.2 |
| 3,127,904 A | 4/1964 | Stillwagon | |
| 3,129,920 A | 4/1964 | Stillwagon | |
| 3,156,161 A | 11/1964 | Forsman et al. | |
| 3,173,650 A | 3/1965 | Cotterman et al. | |
| 3,233,861 A | 2/1966 | Stillwagon | |
| 3,241,806 A | 3/1966 | Snell, Jr. | |
| 3,253,815 A | 5/1966 | Stillwagon | |

(Continued)

*Primary Examiner* — Marina Tietjen
(74) *Attorney, Agent, or Firm* — Paul M. Denk

(57) ABSTRACT

An improved disc for a butterfly valve having reduced structure within the bore of the valve, so as to minimize obstruction to the flow of granular material therethrough. Accelerated flow of granular material through the valve is obtained because of the thin dimensions of the butterfly valve. The modified disc includes upper and lower sockets, most of its structure is outside the perimeter of the disc. The disc may be of arcuate shape.

16 Claims, 5 Drawing Sheets

(56) References Cited

U.S. PATENT DOCUMENTS

| | | | | |
|---|---|---|---|---|
| 3,269,414 | A | 8/1966 | Mayo | |
| 3,290,001 | A | 12/1966 | Taylor | |
| 3,298,677 | A | 1/1967 | Anderson | |
| 3,306,316 | A | 2/1967 | Stillwagon | |
| 3,314,641 | A | 4/1967 | Overbaugh | |
| 3,334,650 | A | 8/1967 | Lowrey, et at | |
| 3,346,005 | A | 10/1967 | Hanssen et al. | |
| 3,376,015 | A | 4/1968 | Forsman et al. | |
| 3,452,961 | A | 7/1969 | Forsman | |
| 3,485,476 | A * | 12/1969 | Hemphill | 251/283 |
| 3,537,683 | A | 11/1970 | Snell, Jr. | |
| 3,677,297 | A | 7/1972 | Walton | |
| 3,680,833 | A | 8/1972 | McNeely, Jr. | |
| 3,752,181 | A * | 8/1973 | Morris et al. | 137/375 |
| 3,778,028 | A | 12/1973 | Graves et al. | |
| 3,837,620 | A | 9/1974 | Malloy et al. | |
| 3,904,173 | A | 9/1975 | Naylor | |
| 3,960,177 | A | 6/1976 | Baumann | |
| 4,014,511 | A | 3/1977 | Uno | |
| 4,025,050 | A | 5/1977 | Manki et al. | |
| 4,026,514 | A | 5/1977 | Sumner et al. | |
| 4,065,979 | A | 1/1978 | Killian | |
| 4,077,673 | A | 3/1978 | Takeshita et al. | |
| 4,079,746 | A | 3/1978 | Killian | |
| 4,141,537 | A | 2/1979 | Daghe | |
| 4,275,867 | A | 6/1981 | Schils | |
| 4,289,297 | A | 9/1981 | Nakanishi | |
| 4,335,738 | A | 6/1982 | Nassir | |
| 4,399,833 | A | 8/1983 | Holtgraver | |
| 4,413,393 | A | 11/1983 | Schils | |
| 4,457,490 | A | 7/1984 | Scobie | |
| 4,465,260 | A | 8/1984 | Conley et al. | |
| 4,469,305 | A | 9/1984 | Baumann | |
| 4,496,135 | A | 1/1985 | Scobie | |
| 4,541,612 | A | 9/1985 | Yohner | |
| 4,570,901 | A | 2/1986 | Holtgraver | |
| 4,600,508 | A | 7/1986 | DeGhetto | |
| 4,685,611 | A | 8/1987 | Scobie et al. | |
| 4,699,357 | A | 10/1987 | Sisk | |
| 4,711,427 | A | 12/1987 | Holtgraver | |
| 4,751,938 | A | 6/1988 | Kerns et al. | |
| 4,773,625 | A | 9/1988 | Calvin | |
| 4,822,001 | A | 4/1989 | Sisk | |
| 4,846,221 | A | 7/1989 | Kanemaru | |
| 5,110,191 | A | 5/1992 | Brown | |
| 5,183,391 | A | 2/1993 | Fiedler | |
| 5,207,411 | A | 5/1993 | Sisk | |
| 5,293,903 | A | 3/1994 | Appelwick | |
| 5,360,030 | A | 11/1994 | Sisk | |
| 5,701,927 | A | 12/1997 | Hansen, Jr. et al. | |
| 5,884,898 | A * | 3/1999 | Miyairi | 251/305 |
| 5,980,210 | A | 11/1999 | Tseng | |
| 6,276,658 | B1 | 8/2001 | Austin | |
| 6,557,819 | B2 | 5/2003 | Austin | |
| 2007/0170391 | A1 * | 7/2007 | Liimatta et al. | 251/306 |
| 2009/0004530 | A1 * | 1/2009 | Koenig et al. | 429/34 |

* cited by examiner

BUTTERFLY VALVE DISC TO ATTAIN ACCELERATED FLOW

CROSS REFERENCE TO RELATED APPLICATION

This non-provisional patent application claims priority to the provisional patent application having Ser. No. 61/634,580, having filing date Mar. 2, 2012, which claims priority to the design patent application having Ser. No. 29/373,130, having filing date Mar. 4, 2011; this application claims the benefits of and is a continuation-in-part of the design patent application having Ser. No. 29/374,020, having filing date Jun. 23, 2011; and this application claims the benefits of and is a continuation-in-part of the utility patent application having Ser. No. 13/506,246, having filing date Apr. 6, 2012, now Publication No. US 2012-0241657 A1, which claims priority to the provisional patent application having Ser. No. 61/517,200, having filing date Apr. 18, 2011; all of said applications being owned by a common assignee.

FIELD OF THE INVENTION

This invention relates to a disc for a butterfly valve that is structured to aid in accelerating the flow of usually bulk granular material from a tank trailer or a railway car, or the like, to speed up the unloading of the vehicle, thereby to conserve time during its usage, and in addition, due to the contours of the disc, aids in reducing the sound level associated with such an unloading system. Furthermore, making such a disc of a lightweight material, such as aluminum, decreases the weight of the overall butterfly valve, and its installation, which facilitates its assembly onto a tank trailer in preparation for usage.

BACKGROUND OF THE INVENTION

Butterfly valves has been used upon tank trailers for many years, and they are even applied to help in the unloading of railroad cars, and usually are sufficiently stable in order to prevent any untimely discharge of the conveying cargo, whether it be grains, polymer beads, or other flowable granular material, but at the same time, allows for the manipulation of the valve into an opened position, to provide for prompt discharge of such materials. As can be readily determined, any feature used in the conveying of these types of usable granular materials, and which can facilitate the unloading operation, and at the same time accelerate the time spent in attaining an unloading of a tank trailer, usually equates to a time savings, which results in lower costs, which is a prime factor always sought by the transporting companies, in their hauling of such materials.

Hence, the design of any components of the unloading devices that adds efficiency as used in conjunction with tank trailers, and the like, is always a welcomed enhancement to this particular field of transportation. Time is money, and any savings that can be achieved are welcomed by the industry.

Thus, the concept of the current invention is to add features to the disc portion of the butterfly valve, which have been found to aid in the unloading process, function to help accelerate the speed of unloading a tank trailer, in addition to reducing any noise associated with such an operation. Furthermore, providing a disc for a butterfly valve that will aid in the prevention of the binding, wedging, or clogging of any granular material within the valve, which may be carried over to the next load, is a welcomed improvement to the design of butterfly valves, as used for these purposes.

Butterfly valves, as previously commented, have been around for sometime. The inventor herein has provided inventive improvements to butterfly valves, for many years, such as can be shown in his U.S. Pat. No. 4,699,357, identified as a Reinforced Industrial Butterfly Valve.

The inventor has also obtained U.S. Pat. No. 4,822,001, upon a Positive Fluid Seal Butterfly Valve. These have to do with the gasket structures for such valves.

A further patent obtained by the inventor herein, upon a Butterfly Valve Assembly, is shown in his U.S. Pat. No. 5,207,411. It is to be noted from this prior patented device that there are attachment mechanisms that extend along the exterior of the butterfly valve, in order to provide for bolting of the disc to the valve, and these types of structures, it has been found, not only function as an obstruction to the uniform flow of the granular material from the valves, but likewise, provide wear points that can cause an abrasive wear out, of the valve structure, due to the constant impingement of the unloading granular material flowing against and past this part of the valve disc, during a continuous unloading process.

Another prior patent to the inventor herein is U.S. Pat. No. 5,360,030, upon a Butterfly Valve Incorporating Sleeve Seals.

Other types of discs for use in a butterfly type of valve, or a throttle, can be seen in the early patent to Peterson, U.S. Pat. No. 965,322, apparently used in an automotive setting.

The patent to Balthasar, U.S. Pat. No. 1,302,891, shows a butterfly type valve for use, and it is held by its valve stem, fastening its disc thereto through the use of a fastener, as noted. It is this type of structure that applicant is attempting to avoid, in the structure of his disc for this butterfly valve.

The patent to Brown, U.S. Pat. No. 2,278,421, shows another valve type device.

A thermostatic valve device is shown in another patent to Brown, U.S. Pat. No. 2,361,006.

The patent to Jensen, U.S. Pat. No. 2,816,729, shows a shutoff type of valve for a butterfly type. You can note that it incorporates significant structure, in the form of fasteners, which secures its disc to its stem, as can be noted. This is the type of structure applicant is attempting to avoid.

The patent to Bryant, U.S. Pat. No. 2,882,010, shows a flow control type of valve.

The patent to Mayo, U.S. Pat. No. 3,269,414, shows a Multi-Port Flow-Control Valve.

The patent to Taylor, U.S. Pat. No. 3,290,001, shows a Fluid Pressure Valve having Diverse Material Seal.

That patent to Anderson, U.S. Pat. No. 3,298,677, shows another Throttle Valve for Internal Combustion Engines.

The patent to Walton, U.S. Pat. No. 3,677,297, shows a further structured butterfly valve, with a significantly thick disc structure.

The Valve shown in the patent to McNeely, Jr., U.S. Pat. No. 3,680,833, shows the disc for a valve that has significant bulges structured within it, in order to function as a closure means.

The patent to Baumann, U.S. Pat. No. 3,960,177, shows a Low Torque and Low Noise Butterfly Valve Disc, but it has significant structure that appears to function in the manner of an impeller, with ribs, in order to reduce torque. This patent does describe, though, how the high velocity of the flowing material particularly along the leading edges of the butterfly valves produces undesirable side effects. Such side effects are cavitations with a liquid media, aerodynamic throttling noises with gases, and a high dynamic torque with either of these types of mediums. Applicant's invention is usually used with granular material, and the purpose of his invention is to accelerate flow, and to attempt to reduce the generated noise, during an unloading process through one or more of these butterfly valves through the usage of its uniquely designed disc.

The patent to Nassir, U.S. Pat. No. 4,335,738, shows another structured Butterfly Valve.

The patent to Baumann, U.S. Pat. No. 4,469,305, shows an effort to attain low torque butterfly valve through its designed disc. The disc, though, does incorporate rather significant structure that adds to its width, as can be noted. But it apparently is contoured in a manner that it will attempt to reduce the generation of torque, apparently by contouring its disc surface.

The patent to Graves, et al, U.S. Pat. No. 3,778,028, shows a Lined Butterfly Valve design.

The patent to Naylor, U.S. Pat. No. 3,904,173, shows a further Butterfly Valve Assembly.

The patent to Stillwagon, U.S. Pat. No. 3,100,500, discloses a Disc Valve with Removable Seat and Unitary Stem and Disc, and Seat and Stem Bushing Unit therefore.

The patent to Lowrey, et al, U.S. Pat. No. 3,334,650, shows another Valve.

The patent to Hanssen, U.S. Pat. No. 3,346,005, shows Lined Butterfly Valves.

The patent to Forsman, et al, U.S. Pat. No. 3,376,015, disclosures a High Pressure Disc Valve.

Another patent to Forsman, U.S. Pat. No. 3,452,961, shows another Disc Valve Operator with Compound Driving Linkage.

The patent to Snell, Jr., U.S. Pat. No. 3,537,683, shows a Valve Seat for a Butterfly Valve and Method for Making the Same.

The patent to McNeely, Jr., U.S. Pat. No. 3,680,833, shows another style of a rather bulky Valve.

The patent to Malloy, et al, U.S. Pat. No. 3,837,620, shows a Butterfly Valve Having an Improved Stem Seal.

Another Butterfly Valve is shown in the patent to Uno, U.S. Pat. No. 4,014,511.

A further Butterfly Valve is shown in the patent to Manki, et al, U.S. Pat. No. 4,025,050.

The patent to Sumner, et al, U.S. Pat. No. 4,026,514, shows a Pressure Enhanced Butterfly Valve.

A Traveling Nut Stop Assembly, for what appears to be a butterfly valve, is shown in the patent to Killian, U.S. Pat. No. 4,065,979.

Another patent to Killian shows a Valve Assembly having Adaptor Means, in U.S. Pat. No. 4,079,746.

The patent to Daghe, U.S. Pat. No. 4,141,537, shows another Valve Seat Construction for Butterfly Valves.

The patent to Schils, U.S. Pat. No. 4,275,867, shows a Valve Assembly and Method.

The patent to Nakanishi, U.S. Pat. No. 4,289,297, shows another form of Butterfly Valve. The disc for this valve, as can be noted, has a substantial bulge along its entire diametric length, extending outwardly integrally from its disc, and therefore, does act as an obstruction to the flow of any granular material therepast.

Another Valve Assembly is shown in the patent to Holtgraver, U.S. Pat. No. 4,399,833, upon a Valve Assembly.

Another patent to Schils, U.S. Pat. No. 4,413,393, shows a Method of Manufacturing a Valve Assembly.

A further design is shown in the patent to Scobie, U.S. Pat. No. 4,457,490, for a High Temperature Valve and Seat therefor. It can be seen that this particular disc, for the valve, has substantial width and thickness.

The patent to Conley, et al, U.S. Pat. No. 4,465,260, shows a Plastic Valve and Improved Actuator therefor.

The patent to Scobie, U.S. Pat. No. 4,496,135, shows an Alignment Maintaining Apparatus for Trunnion Mounted Valves.

The patent to Yohner, U.S. Pat. No. 4,541,612, shows a Rotatable Shaft Assembly.

The patent to Holtgraver, U.S. Pat. No. 4,570,901, shows a Positioning Assembly for use with Rotatable Valves. It can be seen that the mounts for its pivots extend almost diametrically across the shown valve element or disc.

The patent to Scobie, et al, U.S. Pat. No. 4,685,611, shows a Butterfly Valve Construction having a Composite Seat.

The patent to Holtgraver, U.S. Pat. No. 4,711,427, shows an Apparatus for Connecting a Valve Element to a Valve Stem.

The patent to Kerns, et al, U.S. Pat. No. 4,751,938, shows an Apparatus for Supporting Structure between Bolted Flanges.

The patent to Calvin, U.S. Pat. No. 4,773,625, shows a Corrosion-Resistant Overlay for the Edge of Butterfly Valves.

SUMMARY OF THE INVENTION

This invention contemplates enhancements to the shape, configuration and structure of the disc for a butterfly valve, so as to enhance and accelerate the flow of granular material from a tank trailer and through the butterfly valve, accelerate the flow of granular material therefrom, and thereby lesson the time required for unloading of the vessel, and furthermore, because of the unique shape of the disc valve, provides greater unobstructed flow of granular material past the valve disc, during an unloading process. In addition, because of the unique shape of the butterfly valve, and particularly its disc, the decibels generated during an unloading procedure has been lessened, thereby reducing the amount of noise generated during the unloading of a tank trailer, railroad car, or the like. In addition, manufacturing the butterfly valve disc of an arcuate shape enhances the flow of granular material therepast, under Bernoulli's principle, which decreases the unloading time of granular material from the tank trailer, etc. Furthermore, making the disc of the butterfly valve, and particularly its arcuate disc, of aluminum, adds to a lesser weight for the overall structure of the accessory, particularly during its installation and removal.

The initial embodiment for the design of the disc for this butterfly valve includes a disc that is structured having reduced size of the mounts for the pivots that connect the disc to the butterfly valve, in its structure. The one piece disc of this invention is designed, and has been calculated, to provide at least 3.6% more open space for flow of granular material past the disc, during an unloading process. In addition, because of the design for the disc of this invention, having a thin disc shape, it provides, and has been calculated, to furnish 10.8% more open area for flow of material past the disc, and through the butterfly valve during unloading. In addition, it has been calculated that the butterfly valve, with its really stemless disc, provides 24.3% more open area through the butterfly valve of this invention, than can be achieved through the prior art type of stem held disc, as known and shown in the art.

In the design of the disc for the valve of this invention, for a butterfly valve, incorporating its disc, which may have a 5" butterfly valve bore, it has been determined that when the disc is fully opened, through its, pivoting approximately 90° during an unloading process, that it provides 19.216 square inches of total open cross-sectional area, through the valve, which is far more than has been obtained from the usage of any prior art style of butterfly valve, as used for these purposes.

The current invention is a three piece disc and stem with step double-d connection between the stem, and its disc, for pivotally mounting of the disc within the butterfly valve. It incorporates steps on the disc hub that locates and seats the stem, and the steps on the hub produce a reduced cross-sectional area, for the disc, in order to attain that more open cross-sectional area for the valve, during usage. Furthermore, the counterbore within the disc hub, that mounts the stem therein, is counterbored, having a double stepped configuration, and conveniently seats the inserted portion of the stem shaft, which has a corresponding step design, so as to provide for full structural support for the step, within the disc, for rotation or pivotal purposes, during its usage. The thickness of the stepped hub, reduces the thickness of the hub when the disc is turned into its opened position, to allow the greater free flow of granular material therepast, but at the same time, the width of the hub may have a width approximating the width of the shaft, or slightly greater, but since that width of the hub is in alignment with the opened position of the disc, it has no effect upon the near unobstructed flow of granular material therepast, since it is in alignment with the flow of the material therepast, as it discharges from the tank trailer, and into a storage bin or other location.

The bottom stem hub is of significantly reduced size, is relatively cone shaped, and thereby accommodates and accelerates the flow of material therepast, and simply has an interior bore, preferably tapered, so that the bottom stem of the butterfly valve inserts therein, as of a similar shape, and simply provides for uniform turning of the disc, within the butterfly valve, as it is manipulated between a closed position, and its 90° fully opened position, as when unloading occurs.

A further modification to the subject matter of the disc of this invention also contemplates the concept of reducing the surface area of the disc, at the position where the valve stems mount for pivotal movement within the butterfly valve. In this modification, the size of the structure integrated into the disc is simply a slightly arcuate crown, almost of button like configuration, which is integrated into the structure of the disc, and provides very little resistance to flow of any material therepast, when the butterfly valve is manipulated into an unloading position. The hub structure integrally extends outwardly from the periphery of the disc, and locates within counterbores or cavities furnished into the surface of the butterfly valve itself, and therefore, provides most of the disc structure, that makes it functionally operative, within the structure of the valve itself, and not extending into the structure of the disc, or valve bore, to attain the benefits of this current invention. It has been found to make a disc of this configuration, as for a 5" butterfly valve bore, furnishes a total open area for the valve, and through the valve, through which the granular material flows, in the vicinity of 19.828 square inches of total cross-sectional opened area, as aforesaid. In addition, this provides an approximate 3.2% more open area, through the valve, than can be obtained from the stepped hub mount, as just previously summarized, and for more open space then can be obtained from discs of the prior art.

Then, the hub that connects with the butterfly valve shaft may incorporate therein counterbores, that provides for that double-d stepped connection, of the operational valve shaft, for use for turning of the valve disc, as previously explained. Any type of step connection could be used, because the hub for the connection to the disc is arranged outside of the bore of the valve, as can be readily determined upon review of the illustrations for this modified design, as disclosed and described in this application.

Hence, the means for connection of the operational shaft, for the butterfly valve, is arranged outside of the open bore of the valve, that bore in which the disc pivots, which therefore reduces the structure located within the openness of the butterfly valve, allows more space for free flow of the granular material through the valve, when performing an unloading function.

It is also likely that the disc of this invention may have a compound taper, that may slightly taper towards its outer edges away from its pivot access, so that when the disc is arranged at a 90° opening, as when the butterfly valve is opened for an unloading procedure, the upper slight slant to the disc may enhance the flow of granular material past both sides of the disc, and the slight taper at the bottom half of the disc may provide further more openness, which may have a tendency to further attract and accelerate the flow of granular material therepast, as it discharges out of the butterfly valve during an unloading procedure.

It is, therefore, the principal object of this invention to provide a butterfly valve that initially enhances the accelerated flow of granular material through the valve, during an unloading process.

Another object of this invention is to provide a uniquely configured disc for a butterfly valve that provides greater openness through the valve, to enhance the flow of granular material therethrough.

Still another object if this invention is to provide a butterfly valve that due to its unique structure has a tendency to reduce the generated decibels of noise, in order to lower the noise generated during an unloading process of a tank trailer, railroad car, or the like.

Still another object of this invention is to provide a tapered or compound tapered disc, for a butterfly valve, that may aid and accelerate the flow of granular material therepast, when the butterfly valve is opened for unloading purposes.

Still another object of this invention is to provide a uniquely design hub, for a butterfly valve, for accommodating the valve shaft, and its matingly engaging within the hub of a disc, that is of reduced size, but internally provides sufficient counterbore design, for securing the end of the shaft thereto, and to attain its engagement, when manipulating the butterfly valve between its opened and closed positions.

A further object is to assemble the butterfly valve incorporating a disc that may be of an arcuate or curved shape, and furthermore, may be made of aluminum or other lightweight material, to enhance its usage in the unloading of granular material from a tank trailer.

Another unique object of this invention is to provide a hub for a disc for a butterfly valve that provides its accommodating opening for securement with the cooperating end of the butterfly valve shaft, that is externally of the bore of the butterfly valve, thereby removing further structure from the pivotal disc, to enhance the surface area for outflow of granular material, and to accelerate its removal from the tank trailer, during an unloading process.

These and other objects may become more apparent to those skilled in the art upon review of the summary of the invention as provided herein, and upon undertaking a study of the description of its preferred embodiments, in view of the drawings.

DESCRIPTION OF THE PREFERRED EMBODIMENT

Figure 1:
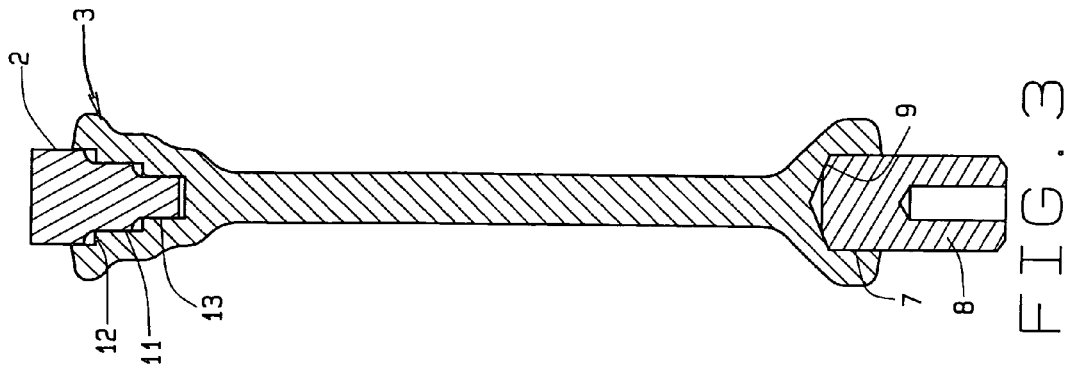
FIG. 1 provides an isometric view of the butterfly valve shaft as mounted within the hub of the disc for the design of this invention.
Figure 2:
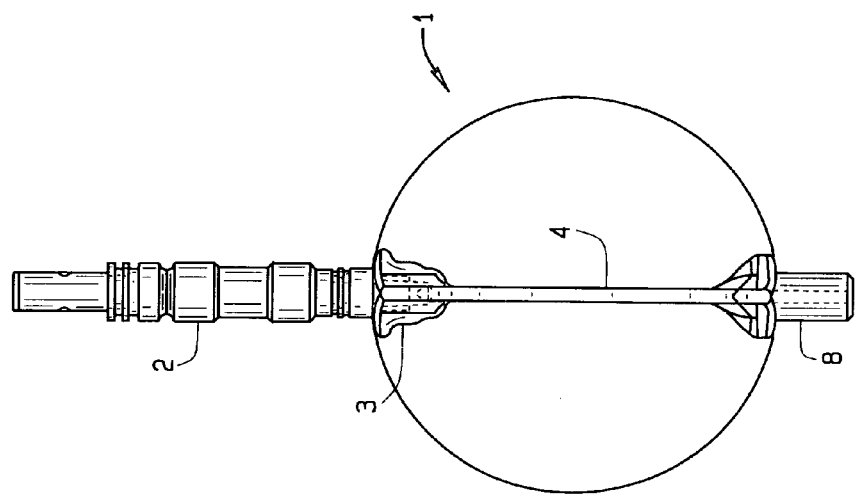
FIG. 2 provides a side view of the disc and shaft, as shown in FIG. 1, showing the thin line dimensions for the thin disc of the butterfly valve for this invention.

In referring to the drawings, and in particular FIGS. 1 and 2, the shaped disc 1 of this invention is disclosed, showing having its operative shaft 2 connected therewith, through its integral socket 3, as can be noted. Initially, this disc is a thin line disc, and therefore, because it has lesser structure, and surface area, when it is opened, for allowing accelerated granular material to flow from the butterfly valve in which it mounts, and as can be seen in FIG. 2, it has a very thin dimension, which provides greater open capacity in the cross-section to allow for flow of the granular material from the tank trailer, through the butterfly valve, and into a storage or conveying area, as known on the art.

As can be seen, the disc has a thickest configuration at approximate its central location, as at 4, and then tapers, as at 5, to its outer edge, where it has its thinnest configuration, as can be noted.

Figure 11:
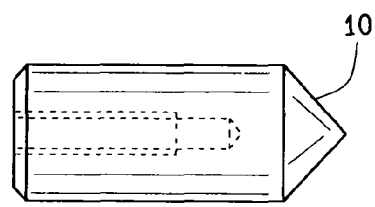
FIG. 11 provides a side view of the pivot pin for holding the bottom of the butterfly valve disc into operative position.

The bottom edge of the disc has an integral socket 6, which has reduced bulk, having a rather cone shaped configuration, as noted, so as to reduce any obstruction to the flow of the granular material therepast, as it is being unloaded. Internally of the socket 6 is a cavity, as at 7 (see FIG. 3) and into which the pivot mount 8 may locate, to provide for precise pivoting of the disc, upon its pin 8, during its manipulation between an opened and closed position, for the butterfly valve, during its operations. The pivot pin 8 may have a slight taper, as at 9, or it may taper up to a point, as can be seen in FIG. 11, as at 10, to provide for its stable mating within the disc cavity 7, when installed.

The upper end of the disc is configured to provide a further socket, as explained at 3, and this socket is configured to provide for accommodating the insertion of the operating shaft 2 therein, in a stepped configuration, as noted at 11, in a type of engagement as identified as the double-d design, so as to provide for a very snug locating and engagement of the operating shaft therein, to provide significant structure to accommodate the turning of the shaft, when it is desired to pivot the butterfly valve disc 1 approximately 90°, to open the valve, and allow for flow of the granular material therethrough.

Figure 5:
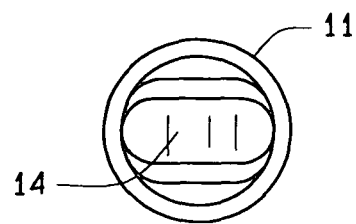
FIG. 5 shows an end view of the butterfly valve hub, into which the valve shaft inserts, and is keyed into position for turning the butterfly valve disc from its open to closed positions, and vice versa, during usage.

It can be seen that the double-d connection 11 is of a stepped configuration, as at 12 and 13, so as provide for a significant mating of these two components together, and in addition, as can be seen in FIG. 1, and FIG. 5, the width of the socket 11, as noted at 14, in FIG. 5, is substantially greater than the thickness of the socket, so as to provide for accommodation of the wider stepped shaft or stem connection between the operating shaft 2, and its connection within the socket 3, as can be noted. It is to be noted that the socket does have reducing dimensions, along its stepped configuration within the said socket 3, so that the accommodating shaft 2 can likewise be of reducing dimensions, so as to lessen the taper 15 of the external surface of the said socket 3, and thereby, when the disc is pivoted into its opened configuration, presents lesser surface area for impingement by the granular material flowing therepast, and thereby enhances and accelerates the flow of granular material therethrough, so as to reduce the amount of time required for unloading of the tank trailer, in the manner as previously analyzed.

Figure 4:
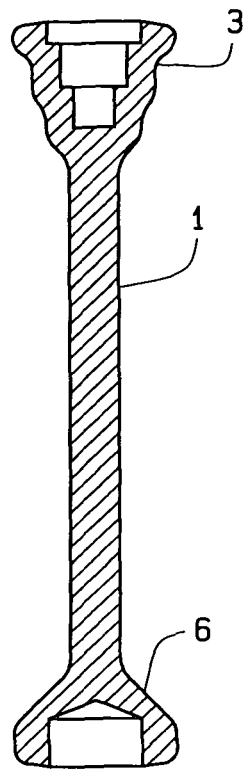
FIG. 4 shows another cross-sectional view of the disc itself.

FIG. 4 provides a cross-sectional view of the structured disc 1, and its integral sockets 3 and 6, that conveniently shows the thin line dimension of the disc, when located within the butterfly valve, and how it reduces the surface area of these operative components, increases the volumetric capacity for flow of granular material through and out of the butterfly valve, during its usage.

Usage of this butterfly valve, and its configured disc, provides the dimensional enhancements for such a valve, with its modified disc therein, so as to attain those beneficial results, as tests have previously shown, to add improvements to such a valve when used within the structure of a tank trailer, railway car, or the like, to attain the percentage benefits particularly when unloading granular material from such vehicles.

Figure 6:
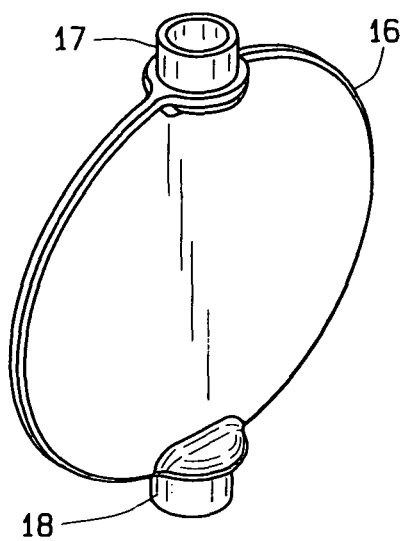
FIG. 6 shows an isometric view of a modified disc, and its integral hubs, for the butterfly valve of this invention.

FIG. 6 shows a further modification to the structure of the butterfly valve disc, as noted at 16, and the structure of the disc itself will be similar to that as previously explained with respect to the disc of FIG. 1, but in this instance, the structure of the sockets, such as its upper socket 17, and its lower socket 18, are provided for further reducing the amount of disc structure that locates within the bore 19 of the butterfly valve. Hence, with lesser structure locating within the bore of the valve, through which the granular material flows, this provides even greater open cross-sectional area, as previously summarized, to allow the unencumbered flow of the granular material therethrough, as during unloading.

Figure 7:
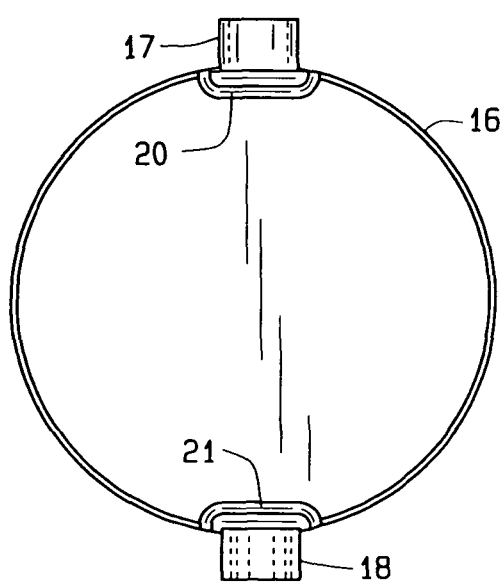
FIG. 7 provides a front view of the disc of FIG. 6.

As can be noted in FIG. 7, most structure of the configured upper socket 17 extends upwardly from the associated disc 16, and all that remains within the entirety of the formed disc is a shallow shoulder, as at 20, that provides the means for seating of the socket 17 integrally with the disc, having its extension, as noted at 17, extending outside the diameter or periphery of the bore of the shown disc, leaving little or no structure within the interior of the bore opening, as at 19, to render any obstruction to the flow of material past the shown disc. In addition, the bottom socket 18 has most of its extension locating further downwardly, outside the periphery of the shown disc 16, and therefore that portion, for mounting of a bottom pivot pin, such as the one explained in FIG. 11, remains outside the surface of the disc, and outside the bore of the butterfly valve, and thereby affords little or no obstruction to the flow of granular material therepast. The only structure internally of the circumference of the disc is that portion 21, which is provided for structural reinforcement purposes, and for the integral seating of the socket 18 when formed with the disc, during its assembly.

Figure 8:
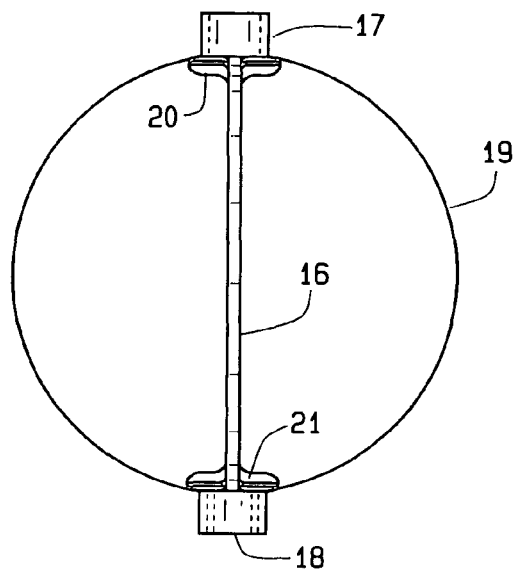
FIG. 8 provides a side view of the disc and hubs, disclosing the thin disc dimensions for the butterfly valve of this invention, and also showing how the hubs extend outside the bore opening of the butterfly valve, in order to reduce the disc structure within the bore opening, as can be noted.

Thus, as can be seen in FIG. 8, there is very little obstructed surface area formed by the thin line disc 16, or its structured socket portions 20 and 21, within the perimeter 19 of the valve bore, so little or no obstruction is presented to the routine flow of the granular material therethrough, during an unloading procedure. Thus, it can be noted that there is very shallow structure, as shown at 20 and 21, associated with the disc 16, within that interior location of the butterfly valve bore, as explained.

Figure 3:
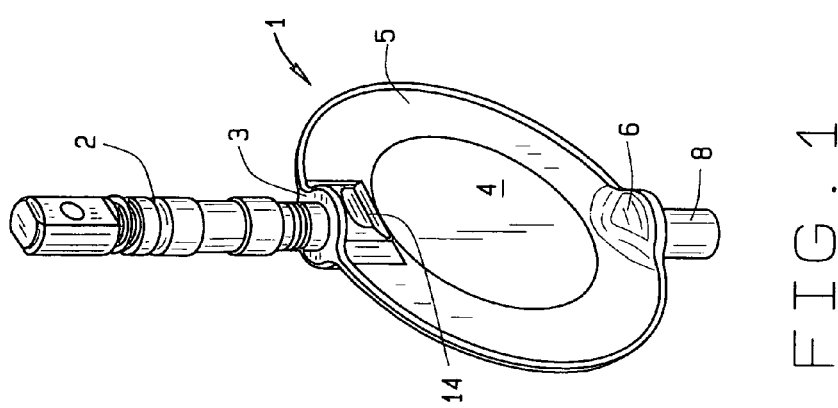
FIG. 3 shows a cross-sectional view of the disc and end of its valve shafts, showing the stepped connection between the operative shaft, and the contiguous hub of the valve disc.
Figure 9:
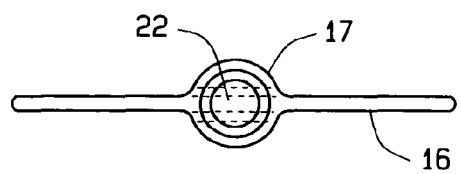
FIG. 9 provides a top view of the disc and hub of FIG. 8.

Once again, as can be noted in FIG. 9, the internal cavities 22 of the upper socket 17 are stepped, similar to that as previously explained with respect to the socket 3, as noted in FIG. 3, so as to accommodate the insertion of the operating pivot shaft 2, of the butterfly valve therein, so that the disc can be conveniently manipulated from a further remote location, when it is required to open the disc, or for unloading purposes, or to close it, when sufficient unloading has taken place. This stepped configuration for the mating of the end of the pivot shaft 2, within the socket, provides sufficient reinforcement for the interconnection of these two components together, so that the disc can be conveniently turned, generally approximately at 90° increments, when it is desired to provide for operations of the butterfly valve, as previously reviewed.

Figure 10:
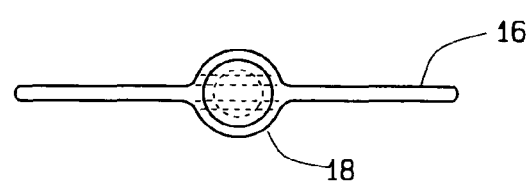
FIG. 10 shows a bottom view of the disc and hub of FIG. 8.

FIG. 10 shows a bottom view of the butterfly valve disc, more particularly as noted at 18, and how it is designed to accommodate the location therein of a pivot pin, as noted in FIG. 11. The pivot pin may have a bevel, as at 10, in order to snuggly fit within the bottom of the disc 16, at its location 18, and function as a highly efficient bearing, with very little lose tolerance, which can extend the useful life of the butterfly valve, and its disc, during its continuous operations. Such a pivot mount 8 may be fabricated of brass, or other bearing like material.

It should be noted that the disc 1 of this invention, of this butterfly valve, may be formed of aluminum in order to significantly reduce the weight of the entire butterfly valve, its various operative components, and particularly its thin line disc, to add to the effectiveness of usage of this butterfly valve after installation. The lighter weight also facilitates the installation or removal of the butterfly valve during its handling.

Figures 12, 13A, 13B:
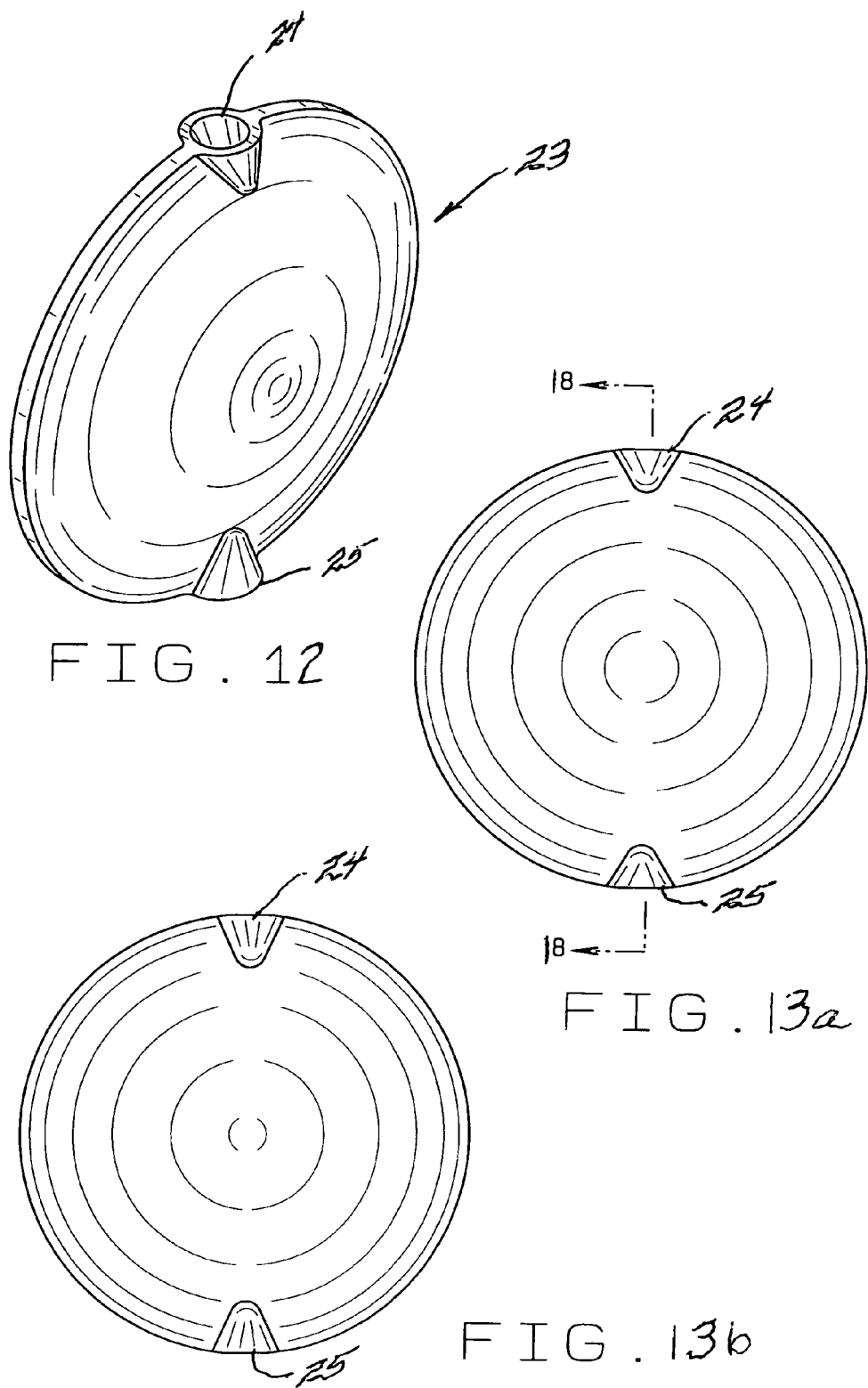
FIG. 12 provides an isometric view of the arcuate butterfly valve disc of this invention.
FIG. 13A provides a front view thereof.
FIG. 13B provides a back view of the disc of FIG. 12.
Figures 14, 15:
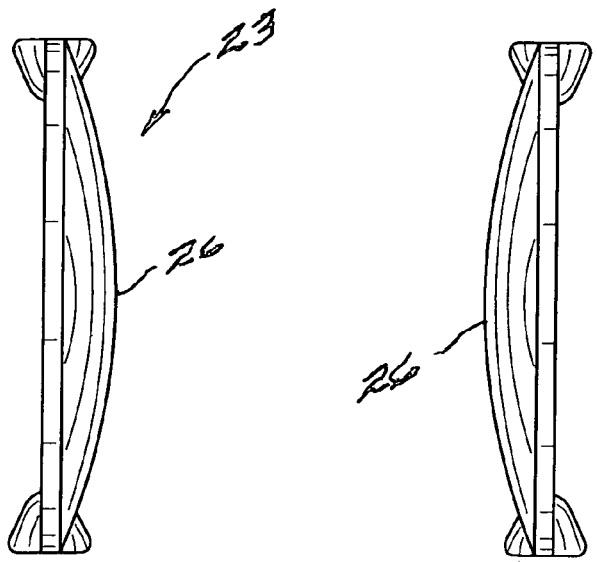
FIG. 14 provides a left side view.
FIG. 15 provides a right side view.
Figure 16:
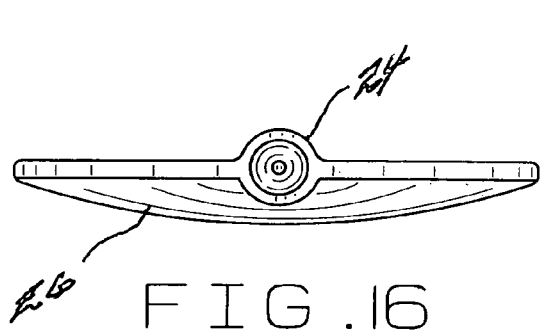
FIG. 16 provides a top view.
Figure 17:
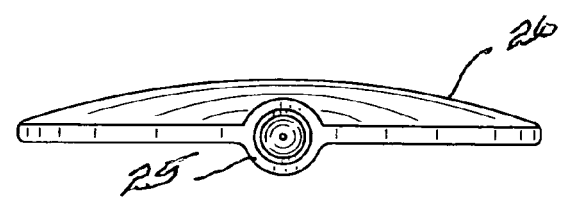
FIG. 17 provides a bottom view.

FIGS. 12, 13A, and 13B disclose a modification to the disc 23 of this invention. More specifically, this modified form of disc is designed to integrate arcuateness into its structure, which has a tendency to help accelerate the flow of the granular material therepast, during its unloading from a tank trailer, or the like. The disc incorporates an upper socket 24 and a lower socket 25 and which cooperate with their associated components, such as an operative shaft, as previously noted at 2, or the pivot mount 8, that positions the bottom of the disc within the butterfly valve during its installation and usage.

As can be noted in FIGS. 14-17, the disc 23 has an arcuateness, as noted at 26, and this has been determined to help accelerate the flow of the granular material therethrough, not too unlike the accelerated flow and lift provided by the multilaminar flow of air past an airfoil, as under Bernoulli's principle. It has been found to provide an acceleration of the flow of granular material, through the butterfly valve, during its usage. It has been determined that it does provide for more flow through the butterfly valve, during its application and usage for the unloading of granular material. In addition to the enhanced benefits through usage of the butterfly valve of this invention, as previously summarized in this specification, it has also been found that the current invention, of its design, reduces the weight of the disc itself, by as much as 22%, over currently prior art styles of butterfly valve disc. In addition, it was found that the decibel level of noise generated during an unloading procedure dropped by approximately two or more decibels, or around 4/10 ths of a percent of noise level. In addition, the pressure drop in the flow of granular material through the butterfly valve increased from 3.8 to 4.6, in various tests, meaning that there was a greater flow of material past the butterfly valve, when using the style of butterfly valve disc, of a thin line and arcuate configuration, as noted for this invention.

Figure 18:
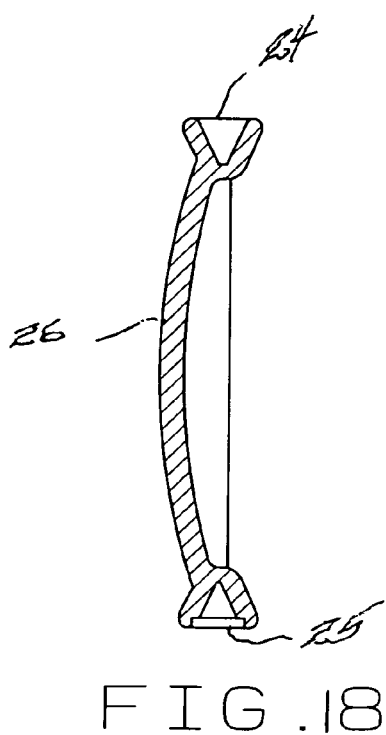
FIG. 18 provides a sectional view of the butterfly valve disc taken along the line 18-18 of FIG. 13A.

The degree of arcuateness for the disc 26 for this invention can be noted in its cross sectional view, as set forth in FIG. 18. Furthermore, the shape and configuration of its sockets 24 and 25 can be readily seen for this design. Obviously, the shapes may be varied, such as shown in FIG. 3, in order to accommodate the type of operative shaft 2 of the means to pivot the butterfly valve disc between its open and closed positions, and the bottom of the disc could likewise be shaped to the configuration as shown in FIG. 3, to accommodate the type of pivot mount 8 as noted therein. In any event, this particular view shows the arcuateness of the disc 26, and likewise, the fact that it may be made of a lightweight material, such as aluminum, to add to the enhancements for the butterfly valve as assembled for this design.

Variations or modifications to the subject matter of this invention may occur to those skilled in the art upon review of the invention as provided herein. Such variations, or their modifications, if within the spirit of this invention, are intended to be encompassed within the scope of any claims to patent protection obtained herein. The depiction of the invention in the drawings, and its explanation within the preferred embodiment, are generally set forth for illustrative purposes only, with respect to the principle of the invention as described.

I claim:

1. A closure disc for a butterfly valve for use in the unloading of granular material, said closure disc being structured to provide for greater accelerated flow of the granular material from a tank trailer and through the butterfly valve during unloading, said disc having a sufficient diameter to dispose said disc in direct contact with an internal bore of the butterfly valve when manipulated into closure, and said disc provided for manipulation at least approximately 90° to provide for opening of the butterfly valve during performance of an unloading procedure, said disc having diametrically opposed sockets, one of the opposed sockets provided for accommodating the location of a pivot pin of the butterfly valve therein, and the other opposed socket provided for accommodating the locating of an operating shaft of the butterfly valve therein, said other opposed socket having a stepped configuration upon an outer surface, so as to reduce the surface area against which the granular material impinges when the butterfly valve is opened during an unloading process, said other opposed socket also having compound sockets provided internally therein, corresponding to the stepped configuration of the external portion of the socket, so as to accommodate the stepped configuration of the operating shaft therein to provide for a structured connection for operating of the valve disc, in preparation for either opening of the disc for unloading of granular material therethrough, or to be pivoted into closure, when it is desired to close the butterfly valve after completion of an unloading function and said sockets incorporate shallow shoulders that bias against an inner surface of the butterfly valve bore opening, with the remainder of a greater cylindrical structure of each socket extending outwardly of a periphery of the internal bore, and extending into the butterfly valve to accommodate the insertion of the pivot pin and the operating shaft within the respective sockets, during assembly and usage of the butterfly valve for unloading purposes.

2. The butterfly valve disc of claim 1, wherein the other opposed socket has a double stepped internal cavity for accommodating the reception of the operating shaft therein, to provide the means for opening and closing of the butterfly valve during its operations of the disc.

3. The butterfly valve disc of claim 1, wherein the other opposed socket has a cavity with the cavity having a width, a thickness, and a length with the width of the cavity being greater than the thickness along the length of the stepped configuration.

4. The butterfly valve disc of claim 1, wherein said disc is formed of lightweight material.

5. The butterfly valve disc of claim 1, wherein the operating shaft has a stepped end and the other opposed socket is provided with internal stepped cavities to accommodate the insertion of the stepped end of the operating shaft.

6. A disc for a butterfly valve, the butterfly valve of the type that is used for unloading granular material, said disc being configured to accelerate the flow of granular material through the butterfly valve, during performance of an unloading operation, said disc being of a thin line configuration, in order to afford greater surface area within a bore of the butterfly valve through which the granular material flows during an unloading operation, said disc having a pair of integral sockets, one socket provided for accommodating a pivot pin of the butterfly valve at one diametric location, the other socket arranged diametrically from the first mentioned socket, and said other socket provided for accommodating the insertion of an operating shaft of the butterfly valve therein, to provide for manipulation of the disc between an opened and closed positions, during usage, said sockets having outwardly extending cylindrical structures beyond the circumference of the valve disc, and for extension within diametrically arranged cavities within the butterfly valve, to provide for pivoting of the valve disc during its usage, and said sockets having lesser surface area within an interior of the butterfly valve bore, than the amount of cylindrical structure for each valve that extends outwardly of a periphery of the disc, and the butterfly valve bore, and into the butterfly valve itself and said sockets incorporate shallow shoulders that bias against an inner surface of the butterfly valve bore, with the remainder of a greater cylindrical structure of each socket extending outwardly of a periphery of the bore, and extending into the butterfly valve to accommodate the insertion of the pivot pin and the operating shaft within the respective sockets, during assembly and usage of the butterfly valve for unloading purposes.

7. The disc for a butterfly valve of claim 6, wherein said disc is formed of lightweight material.

8. The disc for a butterfly valve of claim 6, wherein the other socket is provided with internal stepped cavities to accommodate the insertion of a stepped operating shaft for the butterfly valve therein during its assembly and usage.

9. The disc for a butterfly valve of claim 8, wherein the first mentioned socket includes a cavity therein, for accommodating the locating of part of the pivot pin therein, to accommodate the pivoting of the disc within the butterfly valve during opening and closing of the butterfly valve.

10. The disc for a butterfly valve of claim 9, wherein the pivot pin is tapered upon that end that inserts within the cavity of the associated socket.

11. The disc for a butterfly valve of claim 10, wherein the taper for the pivot pin reduces the associated structure of the socket into which it inserts, to thereby provide additional open surface area within the bore of the butterfly valve to accommodate more accelerated flow of granular material therethrough during an unloading operation.

12. A closure disc for a butterfly valve for use in the unloading of granular material, said closure disc being structured to provide for greater accelerated flow of the granular material from a tank trailer and through an internal bore of the butterfly valve during unloading, said disc having a sufficient diameter to dispose said disc it in direct contact with the internal bore of the butterfly valve when manipulated into closure, and said disc provided for manipulation of at least approximately 90° to provide for opening of the butterfly valve during performance of an unloading procedure, said disc having diametrically opposed sockets, one of the sockets provided for accommodating the location of a pivot pin of the butterfly valve therein, and the opposite socket provided for accommodating a locating of an operating shaft of the butterfly valve therein, said disc of the butterfly valve having an arcuate surface upon at least one of its sides, in order to accelerate the flow of granular material through the butterfly valve when opened for unloading of granular material therethrough and said sockets incorporate shallow shoulders that bias against an inner surface of the internal bore, with the remainder of a greater cylindrical structure of each socket extending outwardly of a periphery of the internal bore, and extending into the butterfly valve to accommodate the insertion of the pivot pin and the operating shaft within the respective sockets, during assembly and usage of the butterfly valve for unloading purposes.

13. The closure disc for a butterfly valve of claim 12, wherein said disc is concaved upon one side surface, and said disc is of convexed shape on its opposite side surface.

14. The closure disc for a butterfly valve of claim 12 wherein said disc is formed of lightweight material.

15. The closure disc for butterfly valve of claim 14 wherein said disc is formed of aluminum.

16. The closure disc for butterfly valve of claim 1 wherein said disc is formed from aluminum.

* * * * *